United States Patent [19]
Keech

[11] 4,109,466
[45] Aug. 29, 1978

[54] HYDRAULIC TRANSMISSION

[75] Inventor: Roger A. Keech, San Luis Obispo, CA

[73] Assignees: Dana E. Keech, San Bernardino; Ronald S. Mullisen, Los Osos, both of Calif. ; part interest to each

[21] Appl. No.: 801,203

[22] Filed: May 27, 1977

[51] Int. Cl.² .............................................. F16D 39/00
[52] U.S. Cl. ........................................ 60/487; 60/491
[58] Field of Search .......................... 60/487, 490, 491

[56] References Cited
U.S. PATENT DOCUMENTS

| 2,434,546 | 1/1948 | Breedlove | 60/491 |
| 2,991,619 | 7/1961 | Powell | 60/491 |
| 3,027,719 | 4/1962 | Keech | 60/491 |
| 3,074,233 | 1/1963 | Keech | 60/438 |

Primary Examiner—Edgar W. Geoghegan
Attorney, Agent, or Firm—Dana E. Keech

[57] ABSTRACT

A co-axial co-planar combined hydraulic vane pump and motor having an interposed annular unitary common connecting element functioning as both pump stator and motor rotor and subject to manipulation as a unit to vary the speed ratio between said pump and motor while presenting continuous smooth annular surfaces interiorly to the pump vanes and exteriorly to the motor vanes. At the same time said novel common element presents unbroken annular polar sealing faces to the confining end walls of the main transmission operating chamber.

8 Claims, 6 Drawing Figures

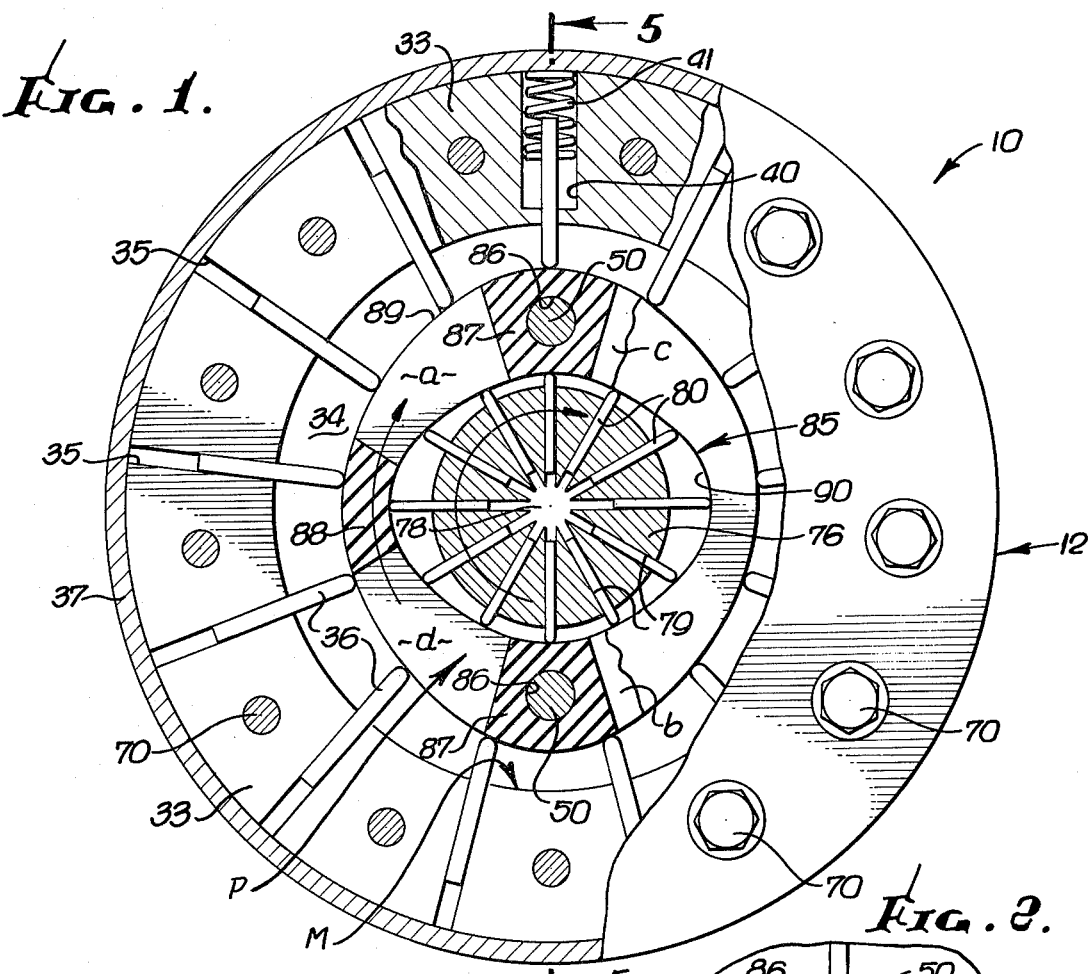
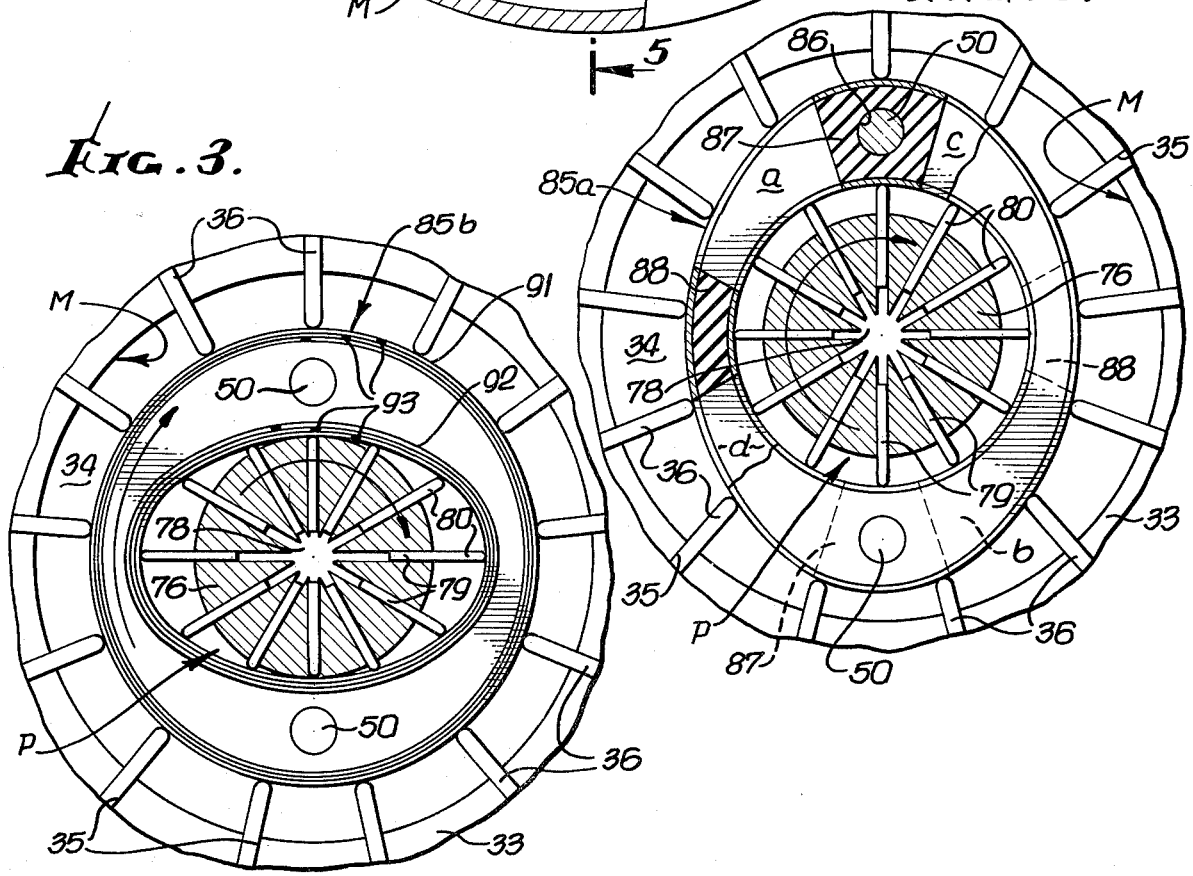

HYDRAULIC TRANSMISSION

SUMMARY OF THE INVENTION

This invention employs the basic principles of and comprises an improvement of the hydraulic transmissions disclosed in my U.S. Pat. Nos. 3,027,719 issued Apr. 3, 1962 and 3,074,233 issued Jan. 22, 1963.

The common element in the patented transmissions consisted of a pair of "J" shaped devices which are slideably associated and connected by curved links at their opposite ends so as to present approximately continuous contact surfaces both interiorly to the pump vanes and exteriorly to the motor vanes and were subject to coordinated manipulation to vary the speed ratio between the pump and motor of the transmission.

The "J" members of the patented transmission however, presented certain disadvantages among which are the following:

1. The mechanical discontinuities between the assembly of parts at the profile surfaces, both internal and external, of the common element with the vanes of both the pump and the motor.
2. Corresponding discontinuities in the faces presented by the patented common element to the end walls of the transmission chamber confining said common element.
3. Noise generation and early degeneration of the precision ground surfaces at the vane tips causing leakage at the sealing areas.
4. The contracting sealed pump chambers are not radially adjacent to their corresponding expanding motor chambers thereby restricting the flow of fluid especially during operation at high speed reduction ratios.

It is thus a prime object of the present invention to eliminate the defects above enumerated which were inherent in the patented common element made up of a pair of intersliding "J" shaped members. This object has been accomplished by the discovery of a unitary annular common element which provides continuous internal and external vane engaging surfaces and which is fabricated so as to be flexible and thus controllable to change the drive ratio geometry at will.

This novel common element also presents unbroken annular parallel sealing faces on its polar extremities, for all drive ratios which it can be controlled to produce, said polar sealing faces providing fluid tight seals between said common element and the end walls of the pump-motor housing chamber of the transmission within which said element is operatively confined.

BRIEF DESCRIPTION OF THE DRAWINGS

FIG. 1 is an axial front elevational view of a preferred embodiment of the invention with portions thereof broken away to show the common element of the transmission in section taken on the line 1—1 of FIG. 5, and with said common element manipulated by the control mechanism to place said transmission in intermediate drive position.

FIG. 2 is a fragmentary sectional view taken on the same section line in FIG. 5 but showing a first modified form of said common element with the same so manipulated to place said transmission in neutral position.

FIG. 3 is a view similar to FIG. 2 showing a second modified form of said common element with the same so manipulated to place said transmission in direct drive position.

DETAILED DESCRIPTION OF THE PREFERRED EMBODIMENT

Figure 5:
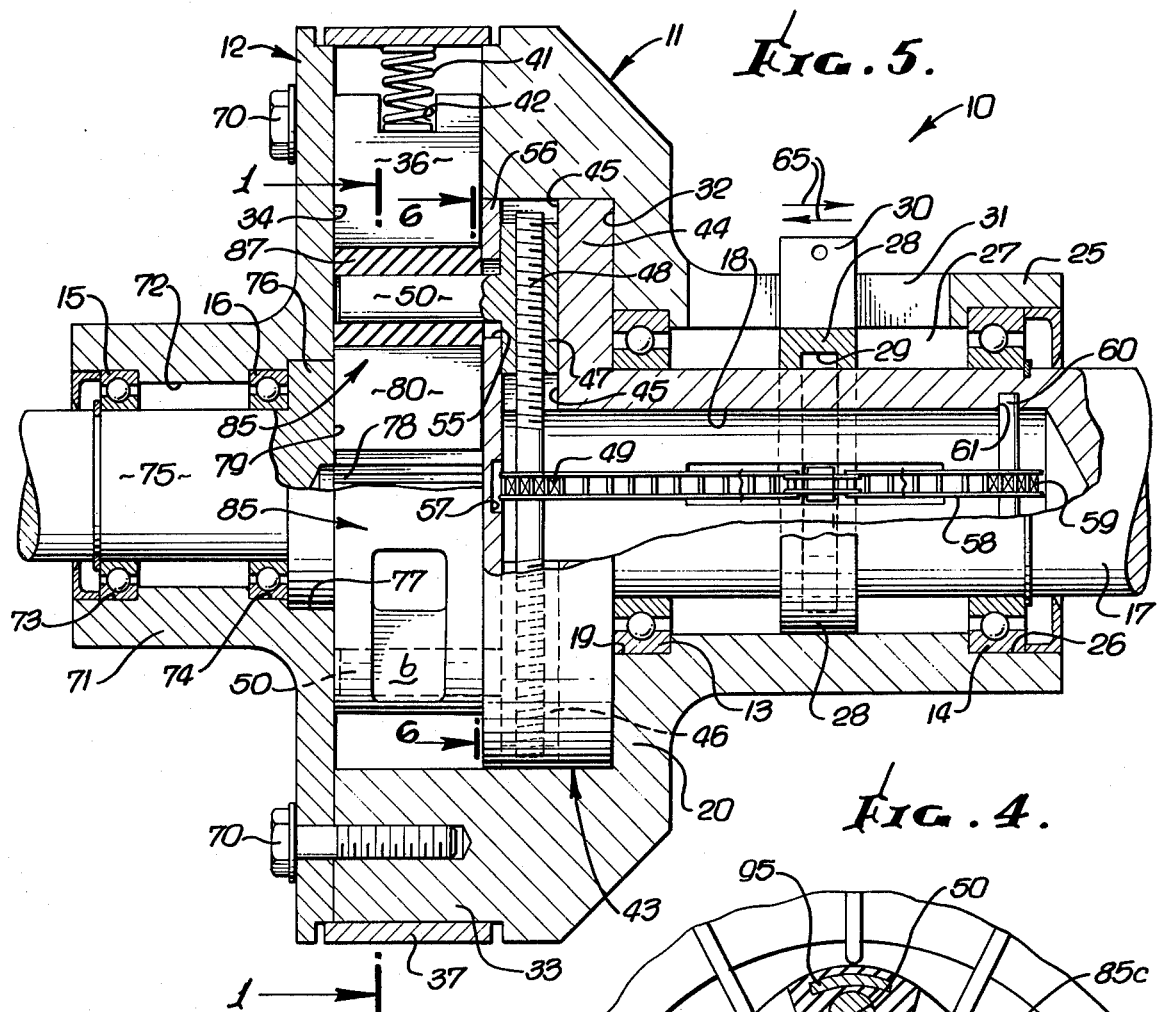
FIG. 5 is a longitudinal vertical sectional view of the invention taken on line 5—5 of FIG. 1 and with the lower half of said preferred form of said common element being shown in elevation.

The invention is preferably embodied in a transmission 10 including a housing 11 having a radial cover plate 12, the housing providing bearings 13 and 14 and the cover plate providing bearings 15 and 16, said bearings being co-axial.

Journalling in bearings 13 and 14 is a driven shaft 17 having a blind bore 18 the length of which is twice the shaft diameter and the internal diameter of which is two-thirds the outside diameter of the shaft.

The bearing 13 is mounted in an axial recess 19 in a back wall 20 of housing 11 and a tubular rear extension 25 from said back wall 20 provides a seat 26 for bearing 14. An annular space 27 between shaft 17 and tubular extension 25 is slideably occupied by a ring 28 having an annular internal groove 29. Ring 28 is slideable lengthwise in space 27 by an arm 30 extending radially outward from said ring through a slot 31 formed lengthwise in housing extension 25.

The housing 11 has a deep counter bore 32 the bottom of which is backwall 20 and the massive side wall 33 of which surrounds the operating chamber 34 of transmission 10 and provides radial slots 35 for guiding the inwardly spring biased vanes 36 of the motor M. A peripheral chamber confining band 37 surrounds housing side wall 33. Radial holes 40 bored into housing side wall 33 in line with slots 35 receive coil springs 41 which fit into notches 42 in outer ends of vanes 36, and constantly bias said vanes inwardly into chamber 34, with said vanes making a liquid tight sealing fit with slots 35 and with the front and back end faces of operating chamber 34, the structure forming which will now be described.

Occupying a rearmost cylindrical space in counter bore 32 and forming the back end face of operating chamber 34 is a pin mounting mechanism 43 including a cylindrical flange 44 having radial front-facing square-cross-section grooves 45 in which long square nuts 46 and 47 tapped respectively with left and right threads are oppositely shiftable by a turnbuckle shaft 48 onto which said nuts are screwed, said shaft having a small diameter central sprocket 49 for rotating the same.

Integrated as by forging or welding with the square turnbuckle nuts 46 and 47 are parallel common element mounting pins 50. Having radial slots 55 for receiving pins 50 is a ground wear plate disc 56 for covering the pin mounting mechanism 43 and providing the rear end sealing wear surface of operating chamber 34.

A shallow central recess 57 is formed in the rear face of disc 56 to give ample clearance between said disc and sprocket 49 about which is trained a chain 58 which connects said sprocket to another sprocket 59 which is freely rotatable on a shaft 60 opposite ends of which extend into diametrically aligned holes 61 formed in shaft 17 at the rear end of blind bore 18 therein. Opposite ends of chain 58 are connected together by a relatively long link 62 having integrally united therewith a short arm 63 which extends radially through a longitudinal slot 64 formed in hollow shaft 17 and into the internal annular groove 29 of ring 28 as shown in FIG. 6. Thus, notwithstanding the fact that shaft 17 is rotated by operation of the transmission 10, the pin mounting mechanism 43 may be actuated to vary the spacing of common element mounting pins 50 by shifting arm 30 axially in slot 31 provided in tubular extension 25 of transmission housing 11 as indicated by the arrows 65 in FIG. 5.

The housing cover plate 12 is secured to the housing side wall 33 by cap screws 70 and has a tubular extension 71 having a bore 72 having annular counterbores 73 and 74 for receiving the bearings 15 and 16. Journalling in said bearings is a drive shaft 75 having a cylindrical pump rotor 76 formed integral with its inner end, said rotor occupying a counterbore 77 formed inwardly from bearing counterbore 74, said rotor also extending therefrom into chamber 34 so as to make a rotatable fluid tight seal with the opposite chamber end face provided by wear plate disc 56 of the pin mounting mechanism 43.

Formed radially from an axial hole 78 in pump rotor 76 are twelve vane guiding and sealing slots 79 which are slideably occupied by a like number of pump vanes 80.

With due regard for operational tolerances to provide for lubrication, the radial opposite side edge faces of motor vane slots 35, motor vanes 36, pumpe vane slots 79 and pump vanes 80 are co-planar with the opposite end faces of operating chamber 34 presented by cover plate 12 and wear plate disc 56 of the pin mounting mechanism 43.

The last element to be assembled with the housing 11 before applying the cover plate 12, drive shaft 75, pump rotor 76 and pump vanes 80 thereto is the novel common element 85 of the transmission 10.

This element preferably comprises a homogenous molded body of flexible material in the form of a ring having, when free of distorting forces as shown in FIG. 1, a uniform axial thickness so that its polar end faces are co-planar with the end surfaces of operating chamber 34 and has a pair of parallel holes 86 which snugly receive the pins 50. These holes are located on the vertical major axis of element 85 near its opposite ends where said holes centrally penetrate the larger two 87 of four nodal masses of the material of which element 85 is molded. The other two smaller nodal masses 88 provided integrally in element 85 are located at the extremities of the minor axis of said element. Four radial ports $a$, $b$, $c$ and $d$ are cast in forming the common element 85 these lying in a radial plane centrally dividing the space in chamber 34, and occupying the areas of said element located between nodal masses 87 and 88. (See FIG. 1).

As shown in FIG. 1, common element 85, when undistorted, reflects a molded external ellipsoidal surface 89 the major axis of which intersects the axes of holes 86, said surface 89 being constantly in liquid tight sealing engagement with the inner extremities of all the motor vanes 36.

The interior of common element 85 provides an internal ellipsoidal surface 90, the major axis of which is normal to the major axis of external surface 89, the surface 90 being constantly in liquid tight sealing engagement with the outer extremities of all the pump vanes 80.

Figure 4:
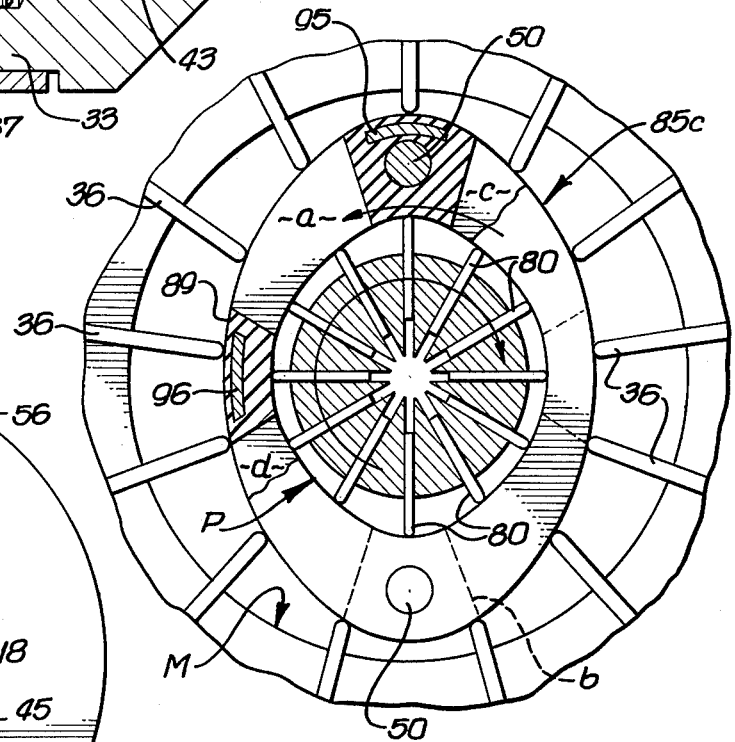
FIG. 4 is a view similar to FIG. 2 showing a third modified form of said common element with the same so manipulated to place said transmission in reverse drive position.

Three modified forms of common element 85 are shown in the operational views of FIGS. 2, 3 and 4. These views accurately disclose the principal drive ratios to which the transmission 10 is adaptable because the modified forms of common element 85 disclosed in these views all have the same outline as element 85 and respond exactly like element 85 to radial movements of the pins 50 shown in said views.

Modified common element 85a is shown in FIG. 2 with pins 50 compressing said element to produce a circular internal pump vane confining surface while the external surface of element 85a is still ellipsoidal in character. This places the transmission 10 in neutral because the pump rotor 76 and its vanes 80 are free to idle in the circular internal surface of element 85a.

Modified common element 85b is shown in FIG. 3 with the pins 50 compressing said element to produce an exaggerated ellipsoidal internal pump vane confining surface within said element, and a circular external motor vane engaging surface of said element. The motor M thus rejects admission thereto of fluid from the pump P thereby locking the pump rotor to the common element 85b and producing a direct drive ratio in transmission 10.

Modified common element 85c is shown in FIG. 4 with both external and internal surfaces ellipsoidal in shape and with their major axes in alignment thus placing transmission 10 in reverse.

OPERATION

Figure 6:
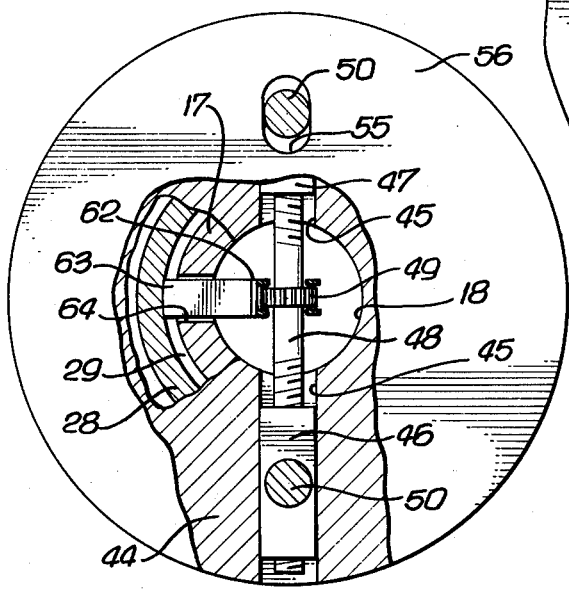
FIG. 6 is a fragmentary vertical sectional view taken on the line 6—6 of FIG. 5 showing details of the common element manipulated mechanism of the invention.

Conversion operationally of the transmission 10 from one to another of the aforedescribed three gear ratios and neutral is effected by any well known manually actuated control device (not shown) which connects to arm 30, whereby the latter is shifted predetermined distances in either of the directions indicated by arrows 65 in FIG. 5.

The pumping action producing a circulation of hydraulic fluid from pump P to motor M and then back to the pump results from the pockets formed by each adjacent pair of pump vanes 80 as that pair move a body of fluid trapped therebetween through the pumping pocket formed by that pair of vanes briefly concurrent engagement with the internal surface presented to said vanes by each of the four nodal masses 87 and 88 of common element 85 (or any of the modified forms of said element).

With pins 50 spaced apart as shown in FIG. 1, the fluid surrounding common element 85 is sucked into pump P through radial ports $c$ and $d$ and expelled through radial ports $a$ and $b$ to produce an intermediate forward drive ratio.

Further separating pins 50 as shown in FIG. 2 further elongates the ellipsoidal external sealing surface of common element 85 so that said element cannot turn without pump P circulating fluid through motor M while at the same time converting the internal ellipsoidal sealing surface of said common element to a circular surface which reduces fluid circulation to zero thus locking said common element against rotation and freeing pump P so that it turns idly.

Still further separating pins 50 as shown in FIG. 4 produces aligned internal and external ellipsoidal vane engaging surfaces on common element 85 which results in liquid being expelled through ports $c$ and $d$ and sucked in through ports $a$ and $b$ thus causing reverse rotation of common element 85 and driven shaft 17.

Shifting pins 50 inwardly to their closest proximity, as shown in FIG. 3, reduces the external motor vane engaging surface of common element 85 to a circle while widely expanding the normal internal ellipsoidal surface to its maximum pumping position. The motor M being unable to receive fluid from the pump P the latter becomes locked to the common element and the latter, presenting a circular external surface to motor vanes 36, turns freely therewithin, producing a direct drive ratio between input shaft 75 and output shaft 17.

MODIFICATIONS

While the preferred form of common element 85 is shown in FIG. 1 as comprised entirely of an integrally molded unit made of rubber or rubber like material, the performance of this may be enhanced by chrome plating the molded unit on the external and internal vane engaging wear surfaces as shown diagrammatically in FIG. 2 in modified common element 85a.

Modified common element 85b shown in FIG. 3, includes a molded rubber core reinforced externally and internally by laminated thin spring steel bands 91 and 92 which are bonded together in closely spaced relation at nodal points as by spot welding 93 to produce a long wearing flexible body ideally suited to performing the functions assigned in this invention to common element 85.

Modified common element 85c shown in FIG. 4 comprises the unitary rubber molded body of the preferred embodiment having arcuate flexible magnets 95 and 96 located in the nodal masses of the element just beneath the external motor vane engaging wear surface 89 of the common element. The magnets 95 and 96 provide centripetal magnetic fields functioning mainly in the nodal areas of the external vane engaging surface 89 to enhance the sealing action between motor vanes 36 and said surface only in said nodal areas which is where said sealing action is of major importance.

I claim:

1. In a co-axial co-planar combined central hydraulic radial vane pump and peripheral hydraulic radial vane motor functioning in a common cylindrical chamber to form a hydraulic positive displacement power transmission, the combination of:
    a flexible, unitary annular common element interposed within said chamber to surround and be engaged by the vanes of said pump and be surrounded and engaged by the vanes of said motor;
    said element having continuous internal and external annular surfaces continually engaging the vanes respectively of said pump and said motor;
    said element having continuous parallel polar surfaces making continuous sealing engagement respectively between each of said polar surfaces and one of the end faces of said chamber,
    co-axial drive and driven shafts connected respectively to said pump and said common element; and
    means operable through said driven shaft to flex the material of said common element to coordinately modify said continuous annular internal and external surfaces thereof and thereby convert said transmission from one drive ratio to another.

2. A combination as recited in claim 1 wherein said internal and external common element continuous vane engaging surfaces are respectively circular and ellipsoidal when said transmission is in neutral.

3. A combination as recited in claim 1 wherein said internal and external common element continuous vane engaging surfaces are respectively ellipsoidal and circular when said transmission is in direct drive.

4. A combination as recited in claim 1 wherein said internal and external common element continuous vane engaging surfaces are both ellipsoidal with their respective major axes normal to each other when said transmission is in intermediate drive.

5. A combination as recited in claim 1 wherein said internal and external common element continuous vane engaging surfaces are both ellipsoidal with their respective major axes in the same axial plane when said transmission is in reverse.

6. A combination as recited in claim 1 wherein
    said common element is mounted on a pair of pins provided by said control mechanism and which are always parallel with and equidistant from the axis of said shafts and are shifted towards or away from each other by said mechanism in converting said transmission from one speed ratio to another.
    said pins penetrating opposite end portions of said element,
    there being four internal concave imperforate pumping faces provided in the internal surface of said common element, two opposite said pins and two spaced midway between the first two,
    said pumping faces being longer than the spaces between outer extremities of adjacent pump vanes,
    there being four correspondingly located external convex imperforate motor driving faces provided on the external surface of said common element,
    said motor driving faces being longer than the spaces between inner extremities of adjacent motor vanes,
    there being four radial ports formed in the areas of said common element not occupied by said eight concave and convex faces,
    two of said ports admitting hydraulic fluid from said motor into said pump and the other two ports conducting fluid compressed in said pump into said motor.

7. An endless integrally bonded common element adapted to jointly function in a common cylindrical chamber as the co-planar co-axial stator of an axial vane pump rotor and as the co-planar co-axial rotor of a peripheral vane motor stator,
    said element having continuous internal and external radial vane engaging annular surfaces,
    said element having continuous parallel polar surfaces approximately co-planar with the end faces of said chamber,
    said element having nodal imperforate fluid sealing areas and, interspersed therebetween, radial fluid, suction and discharge ports.

8. A common element as recited in claim 7 wherein magnetic field producing means are embedded therein exclusively within said nodal imperforate fluid sealing areas to enhance the sealing action of said vane motor stator only while the vanes of said motor stator are opposite said imperforate nodal areas of said common element.

* * * * *